United States Patent
Tranquilla

[19]

[11] Patent Number: 5,986,427
[45] Date of Patent: Nov. 16, 1999

[54] ERROR-COMPENSATED VELOCITY CONTROL

[75] Inventor: Michael N. Tranquilla, Livonia, Mich.

[73] Assignee: Unisys Corporation, Blue Bell, Pa.

[21] Appl. No.: 09/148,907

[22] Filed: Aug. 31, 1998

Related U.S. Application Data

[60] Provisional application No. 60/057,768, Sep. 5, 1997.

[51] Int. Cl.⁶ ..................................................... G05B 5/01
[52] U.S. Cl. ...................................... 318/623; 318/568.18
[58] Field of Search ............................. 318/565, 568.18, 318/571, 601, 623, 615–617

[56] References Cited

U.S. PATENT DOCUMENTS

| | | | |
|---|---|---|---|
| 4,087,173 | 5/1978 | Beery | 355/24 |
| 4,226,546 | 10/1980 | Hoffman | 400/144.2 |
| 4,353,020 | 10/1982 | Veale | 318/601 |
| 4,520,301 | 5/1985 | Suzuki | 318/609 |
| 4,533,991 | 8/1985 | Georgis | 364/164 |
| 4,623,827 | 11/1986 | Ito | 318/341 |
| 4,642,542 | 2/1987 | McKeand | 318/636 |

*Primary Examiner*—Robert E. Nappi
*Assistant Examiner*—Rina I. Duda
*Attorney, Agent, or Firm*—Rocco L. Adornato; Mark T. Starr; John J. McCormack

[57] ABSTRACT

A circuit for controlling a servomotor while minimizing a steady-state velocity error being associated with the servomotor. A velocity transducer is coupled to the servomotor to provide a first signal representing an angular velocity of a servomotor shaft. A comparator receives as input the first signal and a second signal representing a desired angular velocity of the servomotor shaft. The comparator produces a comparator output signal representing the steady-state velocity error as defined by a difference between the angular velocity of a servomotor shaft and the desired angular velocity of the servomotor shaft. Means are provided for deriving a value of a current flowing through the servomotor and for producing a third signal representing that current. The third signal represents a frictional torque applied to the servomotor shaft. An adder receives as input the comparator output signal and the third signal. The adder produces an adder output signal representing a correction to the angular velocity of the servomotor shaft that compensates both for the frictional torque applied to the servomotor shaft and for the steady-state velocity error. Means are provided for amplifying the adder output signal to provide an amplified current and for driving the amplified current to the servomotor to effect the correction to the angular velocity of the servomotor shaft, thereby minimizing the steady-state velocity error.

13 Claims, 4 Drawing Sheets

ERROR-COMPENSATED VELOCITY CONTROL

This is a Continuation of my U.S. Provisional filing, U.S. Ser. No. 60/057,768, filed Sep. 5, 1997 and claims priority therefrom.

FIELD OF INVENTION

This disclosure involves motion servo systems, and especially (modified) feedback means therefor.

BACKGROUND, FEATURES

In the art of positioning elements with servo means workers realize that velocity control is too apt to be deficient, e.g. especially where the servo controls the access and transport of sheet items like documents, and such items can present "friction loading" that varies widely, and can contribute to (steady-state) error in velocity determinations. An object hereof is to ameliorate such and virtually eliminate such friction-caused velocity error by measuring the friction load and using this information to adaptively change an "offset" to compensate for the error.

Often, it is desired to drive a device at very constant velocity to maintain throughput or functional accuracy. For this, a "proportional feedback control" system can be employed. However, such a system produces a steady state velocity error because of friction or other non-inertial loads. An example is a DC motor driven document feeder which separates documents from a stack and feeds them one at a time into a transport for further processing. The load put on the system by the documents is often large and variable, due to differing friction produced by different documents.

Similarly, a sorter used to process both personal checks and flimsy remittance documents would have to deal with largely differing friction loads because of friction differences between these documents. The larger friction would slow the feeder speed, decreasing throughput.

Also, the user of such machines may increase friction load for specific types of documents that may be difficult to separate, again decreasing throughput.

What is New or Different:

This invention adds hardware and/or software to a semiconventional, "proportional velocity feedback control" system that calculates the required adjustments to control system parameters to eliminate steady state velocity error when loads are changed.

More conventional practice would call for very high gain control (systems). But high gain motor control systems may excite mechanical resonances which can render a system too acoustically noisy, cause mechanical fatigue damage, or prevent normal functioning. Another approach is to employ an integrator in the forward loop. But such integrators slow system response; i.e., acceleration and deceleration. Also, one may destabilize a control system by designing it to produce quick response, and so "integrators" typically require a control system with design compromises that may be undesirable.

This invention addresses such shortcomings and virtually eliminates velocity error without high gain and without employing an integrator, thus avoiding their undesirable effects.

BRIEF DESCRIPTION OF THE DRAWINGS

The foregoing and other features and advantages of the present invention will be appreciated by workers as they become better understood by reference to the following detailed description of the present preferred embodiments, these being considered in conjunction with the accompanying drawings, wherein like reference symbols denote like elements:

FIG. 6 is a block diagram of the control means of FIG. 5 with related equations (also see Table IV), while

DESCRIPTION OF PREFERRED EMBODIMENTS

Figure 1:
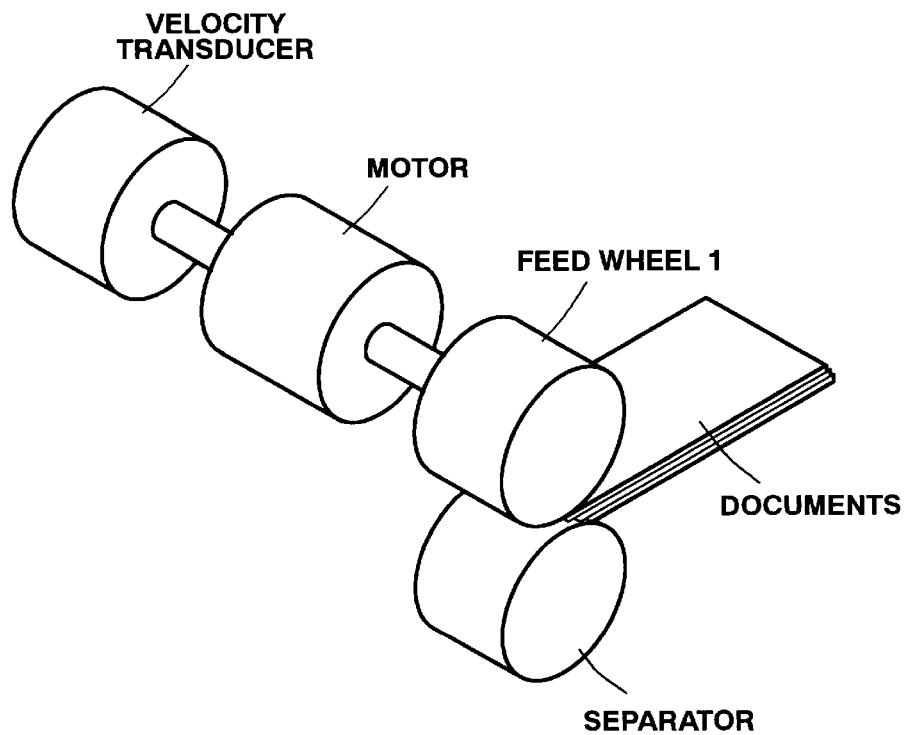
FIG. 1 very schematically illustrates elements of a document feed array; while the FIG. 2 shows a related control system; in a simplified block diagram representation of a circuit for controlling motor/transport speed.

FIG. 1 shows salient features of a rotational, motor-driven positioning servo system. The motor M may be electric, hydraulic, pneumatic or any other type of device which converts energy into rotational motion. This invention will also work for a motor that produces linear motion, such as a hydraulic cylinder. The rotary motion example is used in this embodiment for illustration, since it involves a very common application in many machines.

FIG. 1 illustrates a DC motor driven document feeding mechanism (e.g. 1, 2). A stack of documents dd to be separated and fed to other transports for further processing is forced toward the nip of a feedwheel 1 and cooperating separator 2. Such devices are well known to those practiced in the state of the art of postal sorters, check sorters, copiers, fax machines, sheet feeders for printers, etc. Separator 2 is forced up against feedwheel 1, sometimes with considerable pressure. Rotation rate can be fixed (can be very slow to distribute wear). The feedwheel and separator work in conjunction to allow only one document dd to be fed from the stack at a time. Feedwheel 1 is rigidly connected to the output shaft of a motor M, which is driven by electric current. A velocity transducer VT may be coupled to rotate with M, and to feedback an electrical signal to a control circuit which attempts to regulate motor speed by adjusting its electrical current. Velocity transducer VT may be a shaft encoder or analog tachometer (DC generator).

Separator 2 generally exhibits a high friction surface. Feedwheel 1 experiences considerable torque while it slides a document past separator 2. As soon as one document leaves the nip between 1, 2, another follows, thus producing a relatively steady, continuous friction-torque load, whose magnitude varies with document type and condition. A Document's condition depends on its previous history. For example, a check may be re-fed several times before its final disposition is determined. Separator/feedwheel nip force may be adjusted high or low, depending on whether a particular document type is difficult or easy to separate. This will result in varying friction loads for differing types of work.

Motor M will be understood to drive a load which may be a frictional and/or inertia load, as is common practice for workers familiar with servos. Such inertia may also represent a conveyor belt, or an arm with a magnetic media read/write head at its end, or a pinch roller system transporting a document, etc. (as in FIG. 1) The friction load may result from sliding surfaces in the mechanism, or from windage, or the like.

The servo will typically have means of measuring velocity, e.g., via the use of appropriate transducers such as Velocity Transducer VT. Displacement information may be generated by an electrical encoder; for example, a device that counts passing lines with optical or magnetic detectors, and in conjunction with suitable electronic circuitry, can produce a voltage proportional to the displacement of motor M.

Velocity information may be produced by an electromagnetic generator which will output a voltage proportional to the velocity of motor M (e.g., rotational). Analogous devices exist for hydraulic and pneumatic systems, as realized by those versed in the servo art.

It is also well known to such artisans that displacement information may be derived from velocity information, and vice versa, using hardware or software (e.g., using mathematical integration or differentiation, respectively). This invention will also work with such. Examples in the electronic disciplines are operational amplifiers and digital electronic computers (microprocessors). These expedients are well known to artisans.

Figure 2:
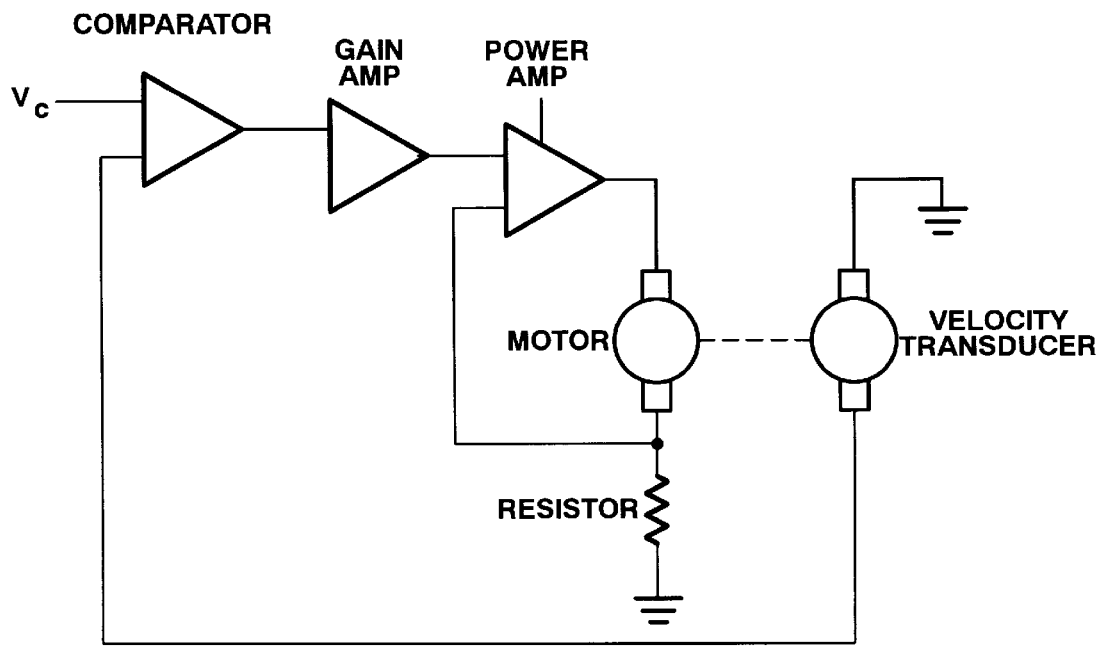

As shown in FIG. 2 velocity information s-v is fed-back to a comparator, 2-1 where it is compared with a "velocity command", also fed into the comparator. If velocity is not as directed (at the desired position), comparator 2-1 will so indicate, causing a motor driver to responsively activate motor M, and move the load. Examples also exist in the electronic disciplines for implementing the foregoing functions, although connected or programmed differently.

FIG. 2 shows an electrical control circuit C-2 typically used for controlling motor speed. The command voltage Vc is fed to a comparator 2-1, which compares it with the electrical signal s-v fed back from the velocity transducer VT. The resultant error signal S-1 from comparator 2-1 is fed to a gain amplifier 2-2, which is a factor that determines system gain as discussed above. The output of the gain amplifier 2-2 is fed to a power amp 2-3 which feeds drive current to the motor M. The voltage across a resister $R_1$ in series with motor M (to ground) will reflect the current through the motor; and can produce signal S-3 which is fed back to the power amp stage 2-3, which responsively continues to adjust its current output until the motor current matches the current being specified by the gain amplifier signal. Motor M produces a torque proportional to its current; and this motor torque drives the motor and its attached loads. Such a system may be characterized as a "proportional controller".

Table I (below) is a list if mathematical symbols and their definitions that will be used throughout the remainder of this disclosure.

TABLE I

| | |
|---|---|
| $w_c$: | commanded angular velocity of motor. |
| w: | actual angular velocity of motor. |
| K: | control system gain |
| T: | motor torque output |
| $T_f$: | friction torque due to feeding documents |
| J: | inertia of feedwheel plus motor armature plus velocity transducer armature. |

TABLE I-continued

| | |
|---|---|
| s: | Laplace transform variable. |
| $K_s$: | integrator constant. |
| $K_f$: | friction torque offset constant. |

Figure 3:
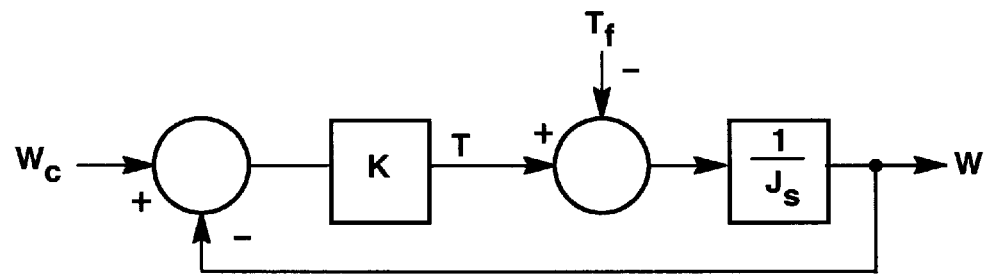
FIG. 3 is a like diagram with related equations (and see Table II) for computing document transport-velocity, as affected by friction and system gain.

FIG. 3 is a very schematic block diagram of a system such as described in FIGS. 1 and 2. Such block diagrams will be recognized by those practiced in the arts of control system theory. A mathematical model of the system can be derived from the block diagram. From control system theory, steady state system equations result when the Laplace transform variable is set to zero. Table II below gives equations for the FIG. 3 system. These show that the actual velocity w remains less than the commanded velocity $w_c$ and is dependent upon the friction torque $T_f$ and control system gain K. Thus, throughput will be degraded in a check sorter, for example, when checks of higher friction are run.

TABLE II $T = K (w_c - w)$ $$w = \frac{1}{Js}(T - T_f)$$

$$w = \frac{1}{Js}[K(w_c - w) - T_f]$$

$Js\ w = Kw_c - Kw - T_f$ $$w = \left[\frac{1}{1 + \frac{Js}{K}}\right] \left[w_c - \frac{T_f}{K}\right]$$

for steady state, $s \rightarrow o$: $w = w_c - T_f/K$

Figure 4:
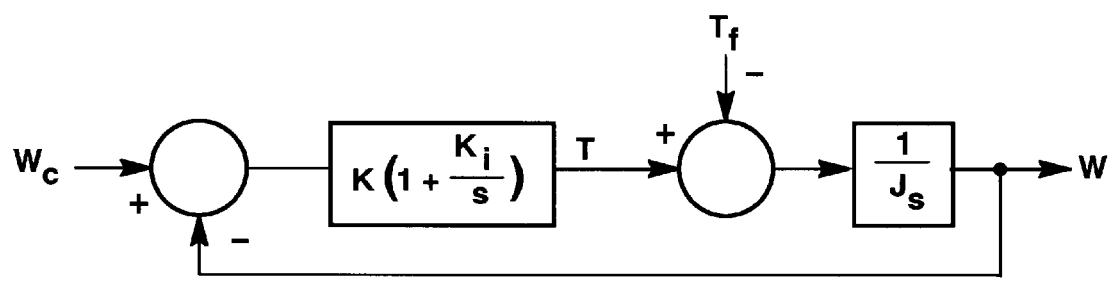
FIG. 4 is a like block diagram, with related equations (see also Table III) with an integrator added (attempting to show that the actual steady-state velocity equals the commanded velocity)

Another way to eliminate the steady state velocity error is to add an integrator in the forward loop. FIG. 4 illustrates a block diagram of such. Table III gives a related mathematical model showing that the actual steady state velocity w is equal to the commanded velocity $w_c$ for steady state. As explained above, and as understood by those in the art, the integrator also affects the acceleration/deceleration response, and can cause instability. The result is often a compromised control design.

Table III summarizes equations relating actual velocity w to command velocity $w_c$, and demonstrating how $w=w_c$ for steady state conditions.

TABLE III $$T = K\left(1 - \frac{K_i}{s}\right)(w_c - w)$$

$$w = \frac{1}{Js}(T - T_f)$$

$$Jsw = T - T_f = K\left(1 + \frac{K_i}{s}\right)w_c - K\left(1 + \frac{K_i}{s}\right)w - T_f$$

$$w\left[Js + K\left(1 + \frac{K_i}{s}\right)\right] = K\left(1 + \frac{K_i}{s}\right)w_c - T_f$$

$$w = \frac{Ksw_c + KK_iw_c - T_fs}{(Js)^2 + Ks + KK_i}$$

TABLE III-continued $$\text{for steady state, } s \to o: w = \frac{KK_i w_c}{KK_i} = w_c$$

Figure 5:
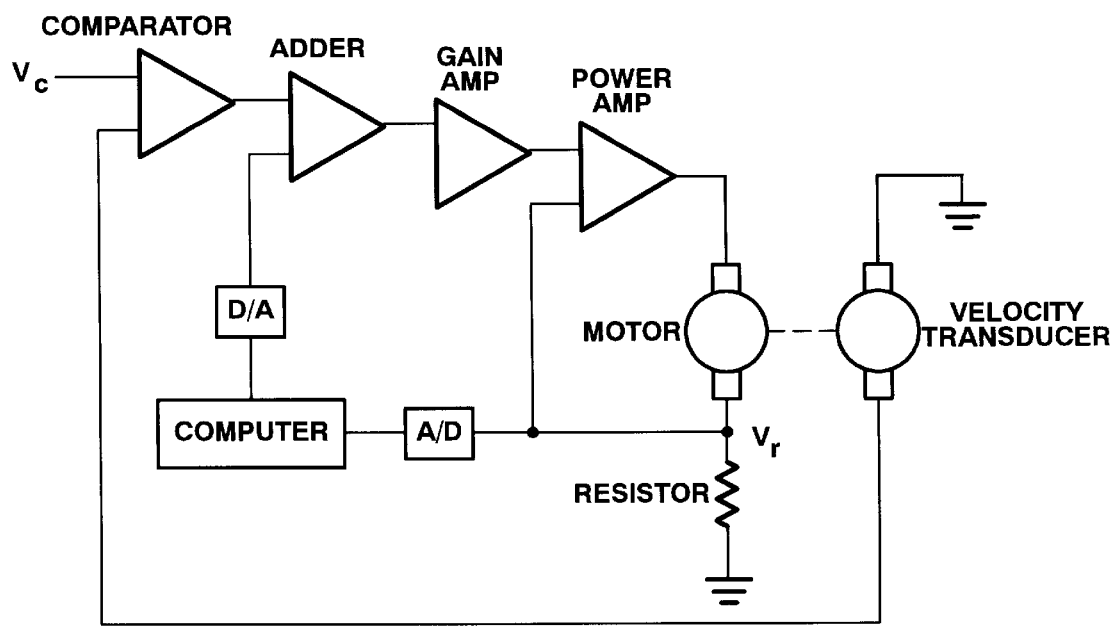
FIG. 5 shows a block diagram like FIG. 2, but with "correction" means added, according to the invention.

This disclosure provides a method of solving the error problem of a proportional controller, while also avoiding the side effects of the proportional controller and the integrator. This method is illustrated in FIG. 5. Here, at steady state speed, the motor M must deliver only enough torque to equal the friction torque $T_f$. The current required to produce this torque is passing through the resistor $R_1$ in series with motor M. The voltage Vr across this resistor represents this current, and hence the friction torque ($T_f$). This voltage is present in virtually all motor control systems.

As illustrated in FIG. 5, $V_r$ (as S-4) can be converted to digital form (at 5-1) and fed to a computer C, which can compute the correction factor needed to compensate for the error. It is not strictly necessary to employ a computer. Hard wired circuitry, or data stored in a PROM (programmable read only memory) may perform this calculation. Computer C then outputs a digital correction which is then converted to analog form by a digital to analog converter (D/A, 5-2), and this correction value (Signal S-6) is summed with the velocity error (S-1 from comparator 2-1) at adder 5-3.

Thus, FIG. 5 represents an "error-compensated system for velocity control"—according to this invention. Here, much as in FIG. 2, comparator 2-1 is input by a "velocity-command signal $w_c$ and by actual detected velocity signal S-V (from transducer VT). A resulting difference (error signal S-1) is produced and is input to gain stage 2-2, whose output is fed to power amp stage 2-3 to drive (regulate) motor M as in FIG. 2.

However, unlike FIG. 2, an adder 5-3 is inserted between comparator 2-1 and gain amp 2-2. Adder 5-3 combines comparator output 2-1 with correction signal S-6 derived from motor current signal S-4, or Vr reflecting frictional torque at motor M, but modified (e.g. converted to digital at A/D unit 5-1, then input to digital computer stage C whose digital output is converted back to analog at D/A unit 5-2 to constitute correction signal S-6.

Figure 6:
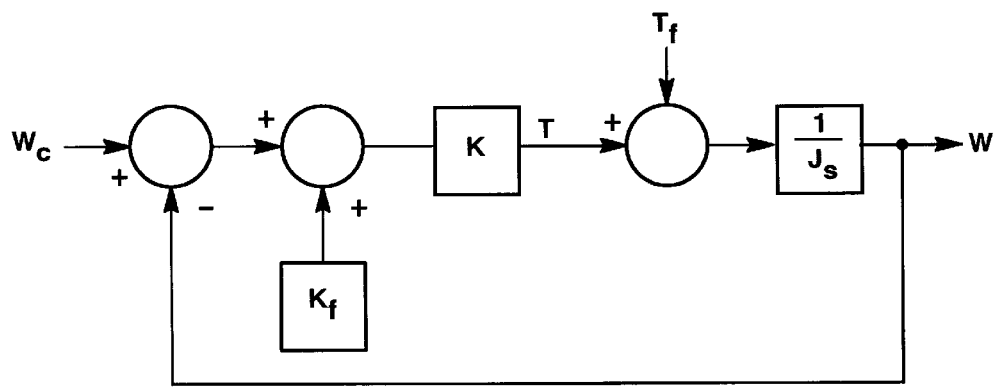

A schematic control system block diagram representing the controller in FIG. 5 is illustrated in FIG. 6. It differs from FIG. 3 only in that a constant $K_f$ is added to the forward loop. "Constant" $K_f$ is periodically computed during steady state operation and is changed if the friction torque changes, as determined by the motor current measurement (which is represented by the voltage Vr across resistor Ri in series with motor M).

A mathematical model for the FIG. 6 block diagram is given below in Table IV.

TABLE IV $$T = K(w_c - w) + K_f K \quad (w = \text{actual veloc.})$$

$$w = \frac{1}{Js}(T - T_f)$$

$$Jsw = T - T_f = Kw_c - Kw + K_f K - T_f$$

TABLE IV-continued $$w(K + Js) = Kw_c + K_f K - T_f$$

$$w\left(1 + \frac{Js}{K}\right) = w_c + K_f - \frac{T_f}{K}$$

$$\text{for steady state, } s \to o: w = w_c + K_f - \frac{T_f}{K}$$

$$\text{note that } w = w_c \text{ if } K_f = \frac{T_f}{K}$$

This illustrates that the actual steady state velocity w is equal to the commanded velocity $w_c$ when the "friction torque offset constant" $K_f$ is equal to the friction torque $T_f$ divided by the system gain K. The friction torque $T_f$ is essentially measured by the series resistor voltage Vr at steady state velocity and the system gain K is a constant known from the control system design. This system is stable, as is the proportional system, yet it avoids velocity error just as the "proportional plus integrator" system does. This system can be very responsive because there is no integrator and because system gain K can be chosen independently.

Because it periodically changes the friction torque offset constant, the control system of FIGS. 5, 6 will maintain the commanded velocity we regardless of whether the friction load will change (e.g. due to change in types of checks being fed in a check sorter). This maintains throughput under these varying conditions.

Figure 7:
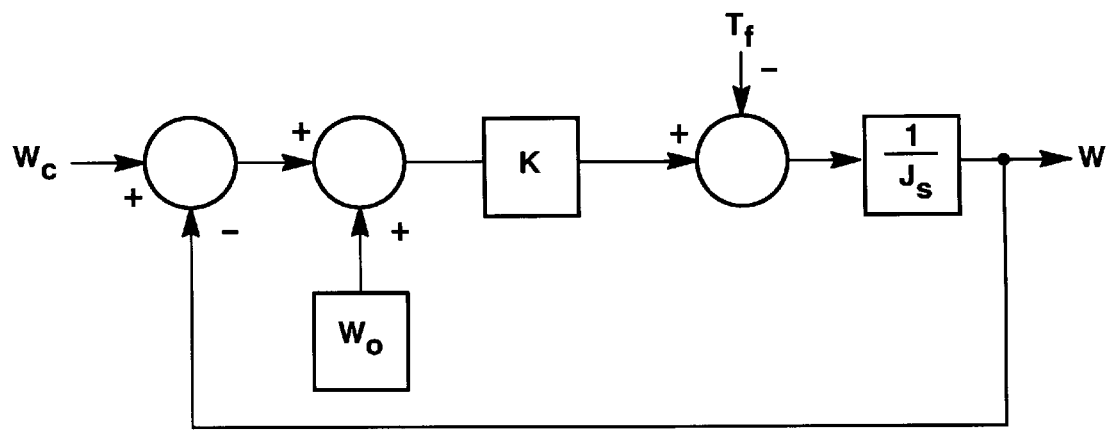
FIG. 7 is similar with error compensating means.

Stated otherwise, and as diagrammed in FIG. 7 (a version of FIG. 6—both serving to explain invention) my invention teaches how to eliminate steady-state velocity error in a proportional velocity servo—where one assumes that actual steady-state velocity w may be equated to command velocity $w_c$ plus the difference between an offset constant $w_o$ and a torque constant $T_f/K$ (or friction torque divided by gain constant K), or $$W = W_c + [w_o - T_f/K]$$

Thus, one selects constant $w_o$ to equal constant $T_{fK}/K$ to reflect zero steady state error; one measures motor current I at steady state ($I_{ss}$), whereby: $I_{ss} \times K_f = T_f$ so $w_o$ becomes: $w_o = I_{ss}(K_f/K)$ Note that $w = w_c$ if $K_{f=Tf/K}$.

SUMMARY OF INVENTION

Thus, this invention teaches eliminating steady state velocity error in a velocity control system by simply measuring the friction load and using this information to give an "offset" constant which compensates for the error.

This invention eliminates velocity error without high gain and without employing an integrator, thus avoiding their undesirable effects.

The separator is generally a high friction surface. The feedwheel experiences considerable torque while it slides a document past the separator. As soon as one document leaves the nip, another follows, thus producing a continuous friction torque load. The magnitude of this load varies with document type and condition. Document condition varies in accordance with its previous history. For example, a check may be re-fed several times before its final disposition is determined. Separator/feedwheel nip force may be adjusted high or low, depending on whether a particular document type is difficult or easy to separate. This will result in varying friction loads for differing types of work.

Stated otherwise, this invention adds hardware and/or software to a conventional, proportional velocity feedback control system that calculates the required adjustments to the control system parameters to eliminate steady state velocity error when loads are changed (e.g. due to paper-feed variations).

And, as workers will realize, eliminating "high-gain" control is desirable; e.g. radically reducing damaging resonances which can make a system too noisy and cause fatigue of parts. Further, this approach allows one to dispense with integrators and their drag on response.

Workers will recognize that this invention can also be used in microfilm film advance servos, document positioning systems, paper advance servos in printers, pen plotters, read/write heads in magnetic and optical digital storage devices, printhead positioning servos in typewriters and computer printers, optical mirror positioning servos, robots, automatic assembly machines, machine tool part positioners.

Of course, many modifications to the preferred embodiment described previously are possible without departing from the spirit of the present invention. For example, there are other different ways to provide the needed feedback signals, and it is not limited to the particular specified ways of detecting motor current. As a further example, the compensatory friction-induced change values can be other than as described in its preferred embodiment. Additionally, some features of the present invention can be used to advantage without the corresponding use of other features.

What is claimed is:

1. A method for attenuating steady-state velocity error in a velocity servo system, without using integrator or high-gain means, said system including motor means, a motor control/gain stage, command input means including comparator means coupled to adjust said motor control/gain stage, and velocity monitor means inputting actual motor velocity values w to said comparator means, this method comprising:

computing a prescribed constant $K_f$ for this system representing "frictional torque offset" and then converting this to a control signal which is then input to said motor control/gain stage, to adjust motor velocity.

2. The method of claim 1, where constant $K_f$ is made equal to the steady state frictional torque value $T_f$ divided by the gain factor K of said motor control/gain stage ($K_f=T_f/K$).

3. The method of claim 2, where constant $K_f$ is derived by measuring the frictional load on said motor means at steady-state conditions, and is added-in at the forward loop of this velocity servo system.

4. The method of claim 3, where actual motor velocity w is derived via velocity transducer means VT coupled to said motor means, and is input to said comparator means.

5. The method of claim 1, where an electrical resistance R is placed in series with said motor means and is used to develop a signal s-v reflecting steady-state current through the motor means, while also being fed to said motor control/gain stage as said offset constant $K_f$.

6. The method of claim 5, where digital computer means is used to derive constant $K_f$, with A/D input and D/A output thereto.

7. A circuit for controlling a servomotor while minimizing a steady-state velocity error being associated with the servomotor, the circuit comprising:

a velocity transducer being coupled to the servomotor to provide a first signal representing an angular velocity of a servomotor shaft;

a comparator receiving as input the first signal and a second signal representing a desired angular velocity of the servomotor shaft, the comparator producing a comparator output signal representing the steady-state velocity error as defined by a difference between the angular velocity of a servomotor shaft and the desired angular velocity of the servomotor shaft;

means for deriving a value of a current flowing through the servomotor and for producing a third signal representing the current, wherein the third signal represents a frictional torque applied to the servomotor shaft;

an adder receiving as input the comparator output signal and the third signal, and producing an adder output signal representing a correction to the angular velocity of the servomotor shaft to compensate both for the frictional torque applied to the servomotor shaft and for the steady-state velocity error; and means for amplifying the adder output signal to provide an amplified current and for driving the amplified current to the servomotor to effect the correction to the angular velocity of the servomotor shaft, thereby minimizing the steady-state velocity error.

8. The circuit of claim 1, wherein the amplifying means includes a gain amplifier coupled to receive the adder output signal and a power amplifier including:

a first input terminal coupled to an output terminal of the gain amplifier, a second input terminal coupled to receive the third signal, and an output terminal for driving the amplified current to the servomotor.

9. The circuit of claim 1, wherein the deriving means includes a resistor coupled between a circuit ground reference and the servomotor, a first analog-to-digital converter coupled to convert an analog voltage across the resistor to a corresponding digital signal, a computer receiving and processing the corresponding digital signal to produce a processed digital signal, and a digital-to-analog converter coupled to convert the processed digital signal into a corresponding analog signal.

10. A method of controlling a servomotor while minimizing a steady-state velocity error being associated with the servomotor, the method comprising the steps of:

providing a signal representing an angular velocity of a servomotor shaft;

providing a signal representing a desired angular velocity of the servomotor shaft;

comparing the signals representing the angular velocity and the desired angular velocity to produce a signal representing the steady-state velocity error;

providing a signal representing a current flowing through the servomotor that represents the frictional torque applied to the servomotor shaft;

adding the signal representing the current to the signal representing the steady-state velocity error to produce a signal representing a correction to the angular velocity of the servomotor shaft to compensate both for the frictional torque applied to the servomotor shaft and for the steady-state velocity error; and amplifying the signal representing the correction to provide an amplified current for driving to the servomotor to effect the correction to the angular velocity of the servomotor shaft, thereby minimizing the steady-state velocity error.

11. The method of claim 10, wherein the step of providing a signal representing an angular velocity includes sampling the velocity of the servomotor shaft with a velocity transducer coupled to the servomotor.

12. The method of claim 10, wherein the step of comparing the signals includes utilizing a comparator receiving as input the signals representing the velocity of the servomotor shaft and the desired angular velocity of the servomotor shaft.

13. The method of claim 10, wherein the step of adding the signal representing the current includes utilizing an adder receiving as input the signal representing the current and the signal representing the steady-state velocity error.

* * * * *

UNITED STATES PATENT AND TRADEMARK OFFICE
CERTIFICATE OF CORRECTION

PATENT NO. : 5,986,427
DATED : November 16, 1999
INVENTOR(S) : Michael N. Tranquilla It is certified that error appears in the above-identified patent and that said Letters Patent is hereby corrected as shown below:

Claims 8 and 9 should depend form claim 7 instead of 1:
    Col. 8, line 23, replace "1" with --7--.
    Col. 8, line 32, repalce "1" with --7--.

Signed and Sealed this

Tenth Day of October, 2000

Attest:

Attesting Officer

Q. TODD DICKINSON
Director of Patents and Trademarks